(12) United States Patent
Burgess et al.

(10) Patent No.: US 12,407,639 B1
(45) Date of Patent: Sep. 2, 2025

(54) SYSTEMS AND METHODS FOR INTEGRATED COMMUNICATIONS

(71) Applicant: United Services Automobile Association (USAA), San Antonio, TX (US)

(72) Inventors: Cleburne Robinson Burgess, Fair Oaks Ranch, TX (US); Richard Paul Proft, San Antonio, TX (US); Jeffrey Alan Smith, San Antonio, TX (US); Katherine Virginia Lamb, Canyon Lake, TX (US); Shanna Ruth Limas, San Antonio, TX (US); Theron Daniel Smelser, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/330,797

(22) Filed: Jun. 7, 2023

Related U.S. Application Data

(63) Continuation of application No. 17/331,104, filed on May 26, 2021, now Pat. No. 11,765,181, which is a continuation of application No. 16/540,892, filed on Aug. 14, 2019, now Pat. No. 11,050,757, which is a continuation of application No. 15/365,650, filed on Nov. 30, 2016, now Pat. No. 10,425,424.

(60) Provisional application No. 62/261,093, filed on Nov. 30, 2015.

(51) Int. Cl.
*H04L 51/56* (2022.01)
*G06F 21/62* (2013.01)
*H04L 12/18* (2006.01)

(52) U.S. Cl.
CPC ............ *H04L 51/56* (2022.05); *G06F 21/62* (2013.01); *H04L 12/18* (2013.01)

(58) Field of Classification Search
CPC .......... H04L 51/56; H04L 12/18; G06F 21/62
See application file for complete search history.

(56) References Cited

U.S. PATENT DOCUMENTS

| | | | | |
|---|---|---|---|---|
| 2002/0098831 A1* | 7/2002 | Castell | ............... | H04L 12/66 455/413 |
| 2007/0239833 A1* | 10/2007 | Alperin | ............... | H04L 67/306 709/224 |
| 2013/0238729 A1* | 9/2013 | Holzman | ............... | H04N 7/147 709/206 |
| 2016/0196442 A1* | 7/2016 | Chapman, III | ..... | G06F 21/6218 726/29 |
| 2016/0320927 A1* | 11/2016 | Labranche | ............... | H04L 67/02 |

* cited by examiner

*Primary Examiner* — Suraj M Joshi
(74) *Attorney, Agent, or Firm* — BakerHostetler

(57) ABSTRACT

Systems, methods, and computer-readable media are provided for online communication tools. A system can include a text module configured to receive short message service text data and text data from an internet-based messaging application; a video module configured to receive previously recorded video data and data from an internet-based video chat application; and an audio module configured to receive audio information from a telephone network and a voicemail messaging system.

17 Claims, 3 Drawing Sheets

SYSTEMS AND METHODS FOR INTEGRATED COMMUNICATIONS

CROSS-REFERENCE TO RELATED APPLICATION

This application claims priority to and is a continuation of U.S. patent application Ser. No. 17/331,104 filed May 26, 2021, which claims priority of and is a continuation of U.S. patent application Ser. No. 16/540,892 (now U.S. Pat. No. 11,050,757) filed Aug. 14, 2019 (Issued Jun. 29, 2021), which claims priority to and is a continuation of U.S. patent application Ser. No. 15/365,650 (now U.S. Pat. No. 10,425,424) filed Nov. 30, 2016 (Issued Sep. 24, 2019), which claims the benefit of U.S. Provisional Application Ser. No. 62/261,093 filed on Nov. 30, 2015, the contents of which is incorporated herein by reference in its entirety.

TECHNICAL FIELD

The present disclosure generally relates to a computer-based system. More particularly, the present disclosure relates to the computer-based system providing multiple communication modes within a portal.

BACKGROUND

Online communication tools provide valuable resources for clients to remotely communicate with service providers. Different types of modules may be used to communicate different types of information or files. For example, secure document signing modules allow for parties to sign or affirm documents remotely. As another example, chat messaging modules allow real-time communications. As yet another example, a document management system allows for remote parties to access and edit the same document.

One disadvantage of these modules is that their functionality is directed to a specific communication method. For example, while email communications can transmit messages and files, they do not provide adequate document management control to track different versions of an edited document. While different communication modules may provide a substitute for a narrow type of communication, they do not provide wholesale features that would allow a client to interact with a service provider as well as an across-the-table meeting. Rather, different technologies need to be downloaded and used separately, which often frustrates clients and limits the quality of customer service they receive.

Thus, there is a need for an integrated communication system that can provide different communication modules in one environment.

SUMMARY

In one embodiment a non-transitory computer readable medium is provided. The non-transitory computer-readable medium stores instructions that when executed by a processor effectuate: a communication portal accessible to at least a first user and a second user; a text module of the communication portal configured to receive text information, wherein the text module includes at least one text interface configured to receive text information from short message service (SMS) messages and text information from at least one internet-based text messaging application; a video module of the communication portal configured to receive video information, wherein the video module includes at least one video interface configured to receive previously recorded video information and video information from at least one internet-based video chat application; and an audio module of the communication portal configured to receive audio information, wherein the audio module includes at least one audio interface configured to receive audio information from a telephone network and audio information from a voicemail messaging system.

In one embodiment a method is provided. The method comprises: receiving text information via a text module, wherein the text module includes at least one text interface configured to receive text information from short message service (SMS) messages and text information from at least one internet-based text messaging application; receiving video information via a video module, wherein the video module includes at least one video interface configured to receive previously recorded video information and video information from at least one internet-based video chat application; and receiving audio information via an audio module, wherein the audio module includes at least one audio interface configured to receive audio information from a telephone network and audio information from a voicemail messaging system; and providing a communication portal accessible to at least a first user and a second user, wherein the communication portal is configured to provide the text information, the video information, and the audio information to the first user and the second user.

In one embodiment a system is provided. The system comprises: means for receiving text information including at least one text interface configured to receive text information from short message service (SMS) messages and text information from at least one internet-based text messaging application; receiving video information via a video module including at least one video interface configured to receive previously recorded video information and video information from at least one internet-based video chat application; and means for receiving audio information including at least one audio interface configured to receive audio information from a telephone network and audio information from a voicemail messaging system; and means for providing an interface accessible to at least a first user and a second user, wherein the interface is configured to provide the text information, the video information, and the audio information to the first user and the second user.

These aspects are provided by way of example only and should not be interpreted as limiting the scope of any claims. Further details as well as alternative or complementary embodiments are set forth in the Detailed Description.

DETAILED DESCRIPTION

Web-based customer service can provide efficient and customer-desirable means of communication and a preferable substitute to in-person business transactions. By providing multiple types of communication within a portal, users can conduct multiple types of communication often used to fulfill a customer service request or business transaction. The present disclosure relates to a communication platform for facilitating web-based customer service and business transactions.

Figure 1:
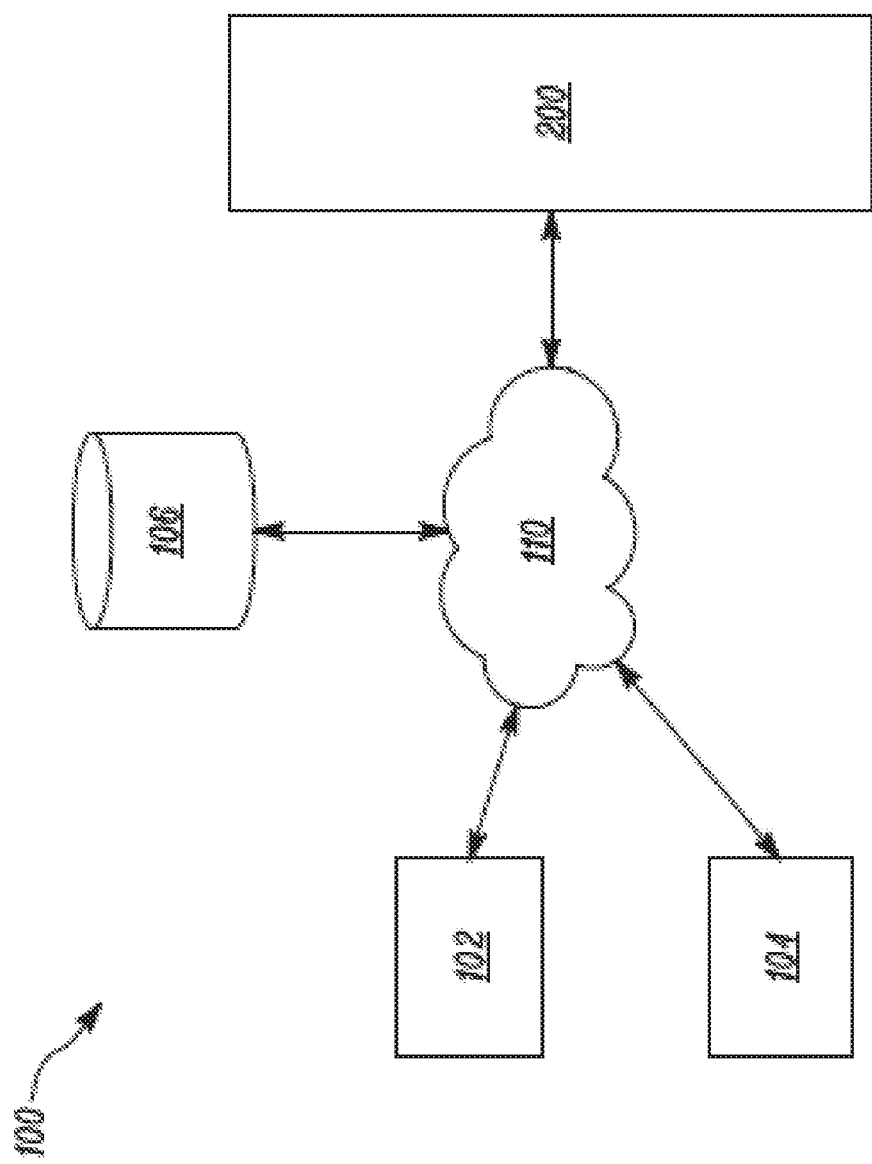
FIG. 1 is a block diagram of an exemplary environment in which modules of an integrated communication portal may be deployed, according to an aspect of the present disclosure.

Now referring to the drawings, wherein like reference numbers refer to like elements, there is illustrated an exemplary environment 100 in which the present disclosure may be utilized, in accordance with an aspect of the disclosure. As shown in FIG. 1, for example, the environment 100 includes users 102, 104, a database 106, and a communication network 110. The users 102 and 104, and the database 106 may communicate with each other over the communication network 110. Examples of the communication network 110 may include, but are not limited to, a wide area network (WAN), a local area network (LAN), an Ethernet, Internet, an Intranet, a cellular network, a satellite network, or any other suitable network for transmitting data. The communication network 110 may be implemented as a wired network, a wireless network, or a combination thereof.

The first user 102 and the second user 104 may comprise any hardware or software suitably configured to facilitate input, receipt, or review of information, including information or files transmitted between users 102, 104. The database 106 may include any device (e.g., personal computer) that communicates (in any manner discussed herein) with the first user 102 and the second user 104 via any network discussed herein. These computing units or systems may take the form of a computer or set of computers, although other types of computing units or systems may be used, including laptops, notebooks, handheld computers, mobile devices, set-top boxes, workstations, computer-servers, main frame computers, mini-computers, PC servers, pervasive computers, network sets of computers, or the like. Practitioners will appreciate that the database 106 may or may not be in direct contact with the users 102, 104. For example, the user 102, 104 may access the services of the database 106 through a remote server, which may have a direct or indirect connection to the communication network 110.

As those skilled in the art will appreciate, the first user 102 or the second user 104 may include an operating system (e.g., Windows, OS X, UNIX, Linux, Solaris, Android, or iOS), various conventional support software, or drivers typically associated with computers. Furthermore, the first user 102 or the second user 104 may include any suitable personal computer, network computer, workstation, mini-computer, mainframe, tablet, mobile device, or the like. Furthermore, the first user 102 or the second user 104 may be in a home, business environment, or public place with access to a network (e.g., airport). In an exemplary aspect, network access is available through a commercial web-browser software package.

In an exemplary implementation as shown in FIG. 1, a communication portal 200 may be communicatively coupled to the first user 102 via the communication network 110. In an aspect, the communication portal 200 may be deployed on one or more servers associated with the first user 102 or the second user 104. In another aspect, the communication portal 200 may be deployed as a separate entity on a third-party server.

The database 106 may also include data related to user profiles for each of the first user 102 or the second user 104. For example, the user profile may include a name, an address, or contact details such as e-mail address, phone number, correspondence address, social security number, or the like. Furthermore, the database 106 may also be configured to store transaction history of the users, account receivable information, credit bureau information, transaction account data associated with the first or second users 102, 104, preference settings, or data from any third-party sources. For example, the database 106 may also store account history of the first or second user 102, 104, such as previous insurance policies, transactions, claims, or the like. In various aspects, the communication portal 200 may be in communication with various third-party sources to retrieve the relevant information.

The user profile may also include permissions regarding access to different modules of the communication portal 200. For example, customers may have read-only access to certain modules or files within the module. As another example, access permissions may limit the ability of the users 102, 104 to communicate with certain other users 102, 104. In an aspect, a customer-user may not have access to initiate communications with certain other customer-users. For example, customer-users may be able to communicate with only customer-service representatives. As another example, customer-users may be able to communicate with other customer-users only if that customer-user is in the same network or group as the customer-user. Certain permissions may provider the user 1-2, 104 with access to historical logs of communications. Another permission may limit access to historical logs to the past thirty days. Any combination of permissions is within the scope of this invention.

As different data may be relevant for different types of users, user profiles may depend upon the type of the first or second user 102, 104, or the first or second user 102, 104's reason for accessing the communication portal 200. The user types include customers, like small-scale and large-scale customers, customer service representatives, like policy brokers, mortgage specialists, banking professionals, lenders, or the like.

The database 106 may employ any type of database, such as relational, hierarchical, graphical, object-oriented, or other database configurations. Common database products that may be used to implement the database 106 include DB2 by IBM (White Plains, NY), various database products available from Oracle Corporation (Redwood Shores, CA), Microsoft Access or Microsoft SQL Server by Microsoft Corporation (Redmond, Washington), or any other suitable database product. Moreover, the databases 106 may be organized in any suitable manner, for example, as data tables or lookup tables. Each record may be a single file, a series of files, a linked series of data fields, or any other data structure. Association of certain data may be accomplished through any desired data association technique, such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, or the like. The association step may be accomplished by a database merge function, for example, using a "primary key field" (hereinafter "key field"), in pre-selected databases or data sectors.

More particularly, a key field may partition the database 106 according to the high-level class of objects defined by the key field. For example, certain types of data may be designated as a key field in a plurality of related data tables, and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the disclosure, any suitable data storage technique may be utilized to store data without a standard format. Data sets may be stored using any suitable technique, including, for example, storing individual files using an ISO/December 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; or other proprietary techniques, which may include fractal compression methods, image compression methods, or the like.

In one exemplary aspect, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using one of fixed storage allocation, circular queue techniques, or best practices with respect to memory management (e.g., paged memory, least recently used). By using BLOB methods, the ability to store various data sets that have different formats facilitates the storage of data associated with the system by multiple and unrelated owners of the data sets. For example, a first data set, which may be stored, may be provided by a first party, a second data set, which may be stored, may be provided by an unrelated second party, and yet a third data set, which may be stored, may be provided by a third party unrelated to the first and second party. Each of these three example data sets may contain different information that is stored using different data storage formats or techniques. Furthermore, each data set may contain subsets of data that also may be distinct from other subsets.

As stated above, in various aspects of the database 106, the data can be stored without regard to a common format. However, in one exemplary aspect of the disclosure, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier, or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on at least the transaction, the first user 102, the second user 104, or the like. Furthermore, the security information may restrict/permit only certain actions such as accessing, modifying, or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate. The data, including the header or trailer, may be received by a standalone interaction device configured to add, delete, modify, or augment the data in accordance with the header or trailer. As such, in one aspect, the header or trailer is not stored on the transaction device along with the associated issuer-owned data, but instead the appropriate action may be taken by providing, to the transaction instrument user at the standalone device, the appropriate option for the action to be taken. The database 106 contemplates a data storage arrangement wherein the header or trailer, or header or trailer history, of the data is stored on the transaction instrument in relation to the appropriate data. One skilled in the art will also appreciate that, for security reasons, any databases, systems, devices, servers, or other components of the database 106 may consist of any combination thereof at a single location or at multiple locations, wherein each database or system includes any of various suitable security features, such as firewalls, access codes, encryption, decryption, compression, decompression, or the like.

In one example, data sets may be configured such that first user 102 and second user 104 may be given different levels of access to the same data set. For instance, a first user 102 may have access to a first subset of a data set and the second user 104 may have access to a second subset of the same data set. The various modules of the communication portal 200 may provide first user 102 and second user 104 access to the respective subsets such that the users may cooperate in viewing, accessing, modifying, and deleting data from the data set. Such access may occur contemporaneously or during disparate time periods.

The disclosure may be described herein in terms of functional block components, screenshots, optional selections, and various processing steps. It should be appreciated that such functional blocks may be realized by any number of hardware or software components configured to perform the specified functions. For example, the communication portal 200 may employ various integrated circuit components, e.g., memory elements, processing elements, logic elements, look-up tables, or the like, which may carry out a variety of functions under the control of one or more microprocessors or other control devices. Similarly, the software elements of the communication portal 200 may be implemented with any programming or scripting language such as C, C++, Java, COBOL, assembler, PERL, Visual Basic, SQL Stored Procedures, or extensible markup language (XML), with the various algorithms being implemented with any combination of data structures, objects, processes, routines, or other programming elements. Furthermore, it should be noted that the communication portal 200 may employ any number of conventional techniques for data transmission, signaling, data processing, network control, or the like. Still further, the communication portal 200 could be used to detect or prevent security issues with a client-side scripting language, such as JavaScript, VBScript, or the like.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks.

In an aspect, the computer program instructions may be executed on any remote-hosted application framework, for example, by a processor associated with a cloud server. Accordingly, the first user 102 or the second user 104 may access the cloud server via any interfaces connected to the Internet.

Figure 2:
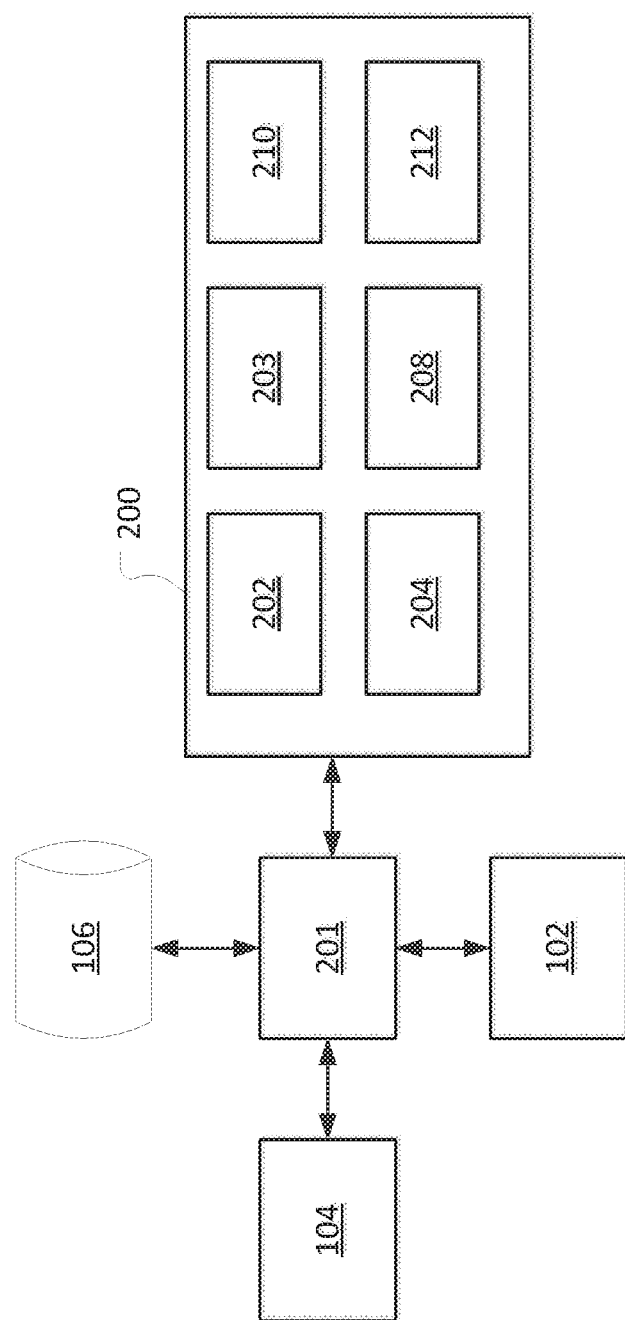
FIG. 2 is a block diagram illustrating an exemplary implementation of the communication portal, according to an aspect of the present disclosure.

Referring to FIG. 2, an exemplary implementation of the communication portal 200 is depicted, according to an aspect of the present disclosure. In the illustrated aspect, the communication portal 200 includes a text messaging module 202, a video module 204, an audio module 206, an electronic signature module 208, a screen-sharing module 210, or a document management module 212, as shown. In an aspect, one or more of the text messaging module 202, the video module 204, the audio module 206, the electronic signature module 208, a screen-sharing module 210, or a document management module 212 may include software instructions stored on memory to be run on a processor. The communication portal 200 may be associated with a graphical user interface of the first user 102 or the second user 104. The communication portal 200 may be communicatively coupled to a server 201. For example, a portion or all of the communication portal 200 may be stored in memory of the server 201 or in memory communicatively coupled to the server 201. In an example, the server 201 may be a web-based server. Furthermore, the communication portal 200 may be configured to communicate with the database 106 or other third-party sources through the communication network 110, as illustrated in FIG. 1.

As will be understood, the modules of the communication portal 200 discussed above may be arranged in any combination. For example, the video module 204 may be integrated with the audio module 206. Likewise, the electronic signature module 208 may be integrated into the document management module 212. As will also be understood, the modules of communication portal 200 may be used to facilitate communications among multiple parties. Thus, while the examples below discuss communications between two users 102, 104, the communication portal 200 may provide for communications among three or more parties.

In an aspect, the text messaging module 202 may be configured to receive one or more text transmissions from the first user 102 or the second user 104. The text messaging module 202 may be configured to transmit the text transmissions between the first user 102 and the second user 104. The text messaging module 202 may further be configured to display these text transmissions or record these text transmissions. For example, a transcript of previous text transmissions may be accessible by the first user 102 or the second user 104 through the text messaging module 202.

The text messaging module 202 may provide one or more inputs for transmitting non-text content, such as emojis, images, or the like. Additionally, or alternatively, the text messaging module 202 may provide shortcut inputs for the first user 102 or the second user 104 to create text messages. As an example, the text messaging module 202 may provide a greeting shortcut to the first user 102 such that the first user 102 may transmit a predefined greeting without typing out each character. For example, upon the first user selecting a "greeting" button, the text messaging module 202 may transmit a message to the second user 104 that states, "Good evening. My name is Mr. Smith and I am your customer service representative for USAA. What can I assist you with today?" These predefined messages may be customizable, such that the name of either the first user 102 or the second user 104 is automatically populated, such that the second user 104 can greet the first user 102 by name. Any number of predefined greetings may be created or stored. The text messaging module 202 may provide options to modify, add, or remove predefined messages. In an aspect, the predefined messages may be associated with the respective user profile of the first user 102 or the second user 104.

Any communication protocol may be used for text transmissions through the text messaging module 202. Furthermore, the text messaging module 202 may provide for communications between the first user 102 and the second user 104 wherein the communication protocols used by the users 102, 104 differ. For example, the first user 102 may send SMS messages that appear in the text messaging module 202, while the second user 104 may use a chat messaging system, such as Google Chat, a private messaging system, such as direct messaging in Twitter, or email to communicate text messages through the text messaging module 202.

The video module 204 may provide controls and displays for facilitating video-based communications between the first user 102 and the second user 104. For example, these video-based communications may include linking or streaming prerecorded videos, such as YouTube videos. In another aspect, the video module 204 may facilitate video chat, similar to FaceTime or Skype. The video module 204 may provide multiple screens such that video streams from more than one source (e.g., multiple users 102, 104) may be displayed simultaneously through the communication portal 200. The video module 204 may be communicatively coupled to a camera or microphone of the users 102, 104. The video module 204 may provide controls to mute the microphone of one or more of the users 102, 104, similar to video conferencing systems. Furthermore, the video module 204 may provide controls for adjusting the volume, starting, pausing, stopping, rewinding, or fast-forwarding video outputs. Other controls associated with video outputs are contemplated within the scope of this invention.

The video module 204 may provide for embedding videos, such as YouTube videos, in communication portal 200. This may provide for customer-users to search and view instructional or advertisement videos, for example. The video module 204 may also provide for the users 102, 104 to upload videos directly into the communication portal 200. In an aspect, the user 102 may upload a video that shows the walk-through of a house the use 102 is seeking to obtain insurance for or a video showing damage for the customer-service representative to provide an official or unofficial assessment for insurance purposes. The video module 204 may allow for live streaming of video as well. For example, the communication portal 200 may allow the user 102 to view streaming video from a security camera or the like. Videos may be linked or uploaded to the communication portal 200 through the video module 204 in any known means. For example, the user 102 may email a file or a link to a file to facilitate viewing of the file by the second user 104.

The communication portal 200 may also include the audio module 206. In an aspect, all or a portion of the audio module 206 may be integrated into the video module 204 for providing audio output associated with the videos viewed, uploaded, or accessed through the video module 204.

The audio module 206 may provide audio communications, such as those associated with telephonic communications, including live audio communications or voice mail messaging. For example, the user 102, 104 may initiate a voice communication with another user 102, 104. The audio module 206 may be integrated to work with the hardware or software of the users 102, 104. For example, where the user 102 is a mobile telephone, the user 102 may initiate a voice communication by dialing a telephone number associated with the communication portal 200. As another example, when the user 102 is receiving a request to initiate an audio communication through the audio module 106, the user 102 may treat the incoming communication as a telephone call, including ringing or vibrating to provide an alert of the incoming call and allowing the call to be accepted or rejected through the telephone interface of the user 102. The audio module 206 may be configured to record audio communications. In an aspect, the audio module 206 is integrated with the text messaging module 202 to transcribe audio communications.

The communication module 200 may include an electronic signature module 208. The electronic signature module 208 may be configured to facilitate review and authorization of documents, including contracts, that may need a signature or acknowledgement. The electronic signature module 208 may provide one or more ways to affix a signature to a document. For example, the electronic signature module 208 may be integrated with a biometric input of the users 102, 104. In an aspect, the electronic signature module 208 may allow signatures to be affixed or verified based on a fingerprint input from the user 102, 104, such as from the fingerprint sensor of an iPhone or iPad device. As another example, the electronic signature module 208 may use face or voice recognition to verify or affix a signature to a document. In this manner, the electronic signature module 208 may be integrated with the video module 204 or the audio module 206 to receive image or audio input from the first user 102 for verifying or affixing the signature.

The electronic signature module 208 may provide for signatures to be added using a password or by a typed password input via a keyboard. As another example, the signature may be input by a user "signing" a touch input at the first user 102. For example, the electronic signature module 208 may display a signature line via a display of the first user 102, and a finger or stylus may be used to draw a signature on a touchscreen display of the first user 102. Other known methods for electronically signing or accepting conditions or agreements via a computer system are contemplated as being within the scope of this disclosure.

The communication portal 200 may include a screen-sharing module 210. In this manner, the first user 102 may share its screen with the second user 104. This may be used for the same version of a document or other file to be viewed simultaneously by different users 102. In an aspect, the screen-sharing module 210 may be integrated with the audio module 206 to allow for discussion of documents or other files visible through the screen-sharing module 210. The screen-sharing module 210 may be used for presentations or the like. The screen-sharing module 210 may be integrated with the electronic signature module 208 such that at the second user 104 the application of a signature by the first user 102 may be witnessed or viewed in real time. The communication portal 200 may also include a document management module 212.

The document management module 212 may provide for documents to be uploaded, downloaded, stored, or edited on the communication portal 200. In an aspect, the document management module 212 may provide version control, such that different edits from different users may be captured in a manner that the edits do not conflict. This may include locking versions of documents such that the first user 102 may not edit the same document that the second user 104 is editing. In another aspect, the document management module 212 may be incorporated with the screen-sharing nodule 210 such that multiple users 102, 104 may simultaneously edit a document. In an aspect, this may include the version of the document visible to the users 102, 104 may dynamically change in response to edits of the document by other users 102, 104. The document management module 212 may record access or document edits. For example, this may include saving different versions of the document. In another aspect, this may include storing a listing of edits made to the document throughout the course of its lifetime. The document management module 212 may be integrated with the electronic signature module 208 such that the signed versions of documents may be saved. Other document management functionality is contemplated as being within the scope of this disclosure.

As was discussed earlier herein, the various modules of communication portal 200 may provide first user 102 and second user 104 access to the respective subsets such that the users may cooperate in viewing, accessing, modifying, and deleting data from the data set. Such access may occur contemporaneously or during disparate time periods. For example, screen sharing module 210 and document management module 212 may cooperate to allow first user 102 and second user 104 to view a particular document. However, first user 102 may have access to a first subset of data comprising the document and second user 104 may have access to a second subset of data comprising the document. Such a use case may result from first user 102 and second user 104 having different security levels. For instance, first user 102 may have access to the entire document and second user 104 may have access to a portion of the document. For example, a customer may want to share a sensitive document with a customer service representative but may not want the customer service representative to see the entire document due to there being sensitive personal information in the document. Accordingly, screen sharing module 210 and document management module 212 may cooperate to mask part of the document from the customer service representative. Such an approach may be implemented by masking the relevant secure portions of the document from the second user 104. In another example, data set annotation may be used to establish different security levels for the subsets. Accordingly, first user 102 may have a security level sufficient to receive a first subset of data whereas second user 104 may have a security level sufficient to receive a second subset of data, wherein the first subset of data is greater in size and/or scope than the second subset of data. Therefore, the data that the second user 104 is not permitted to access will be prevented from being sent to or rendered on the device of second user 104.

Figure 3:
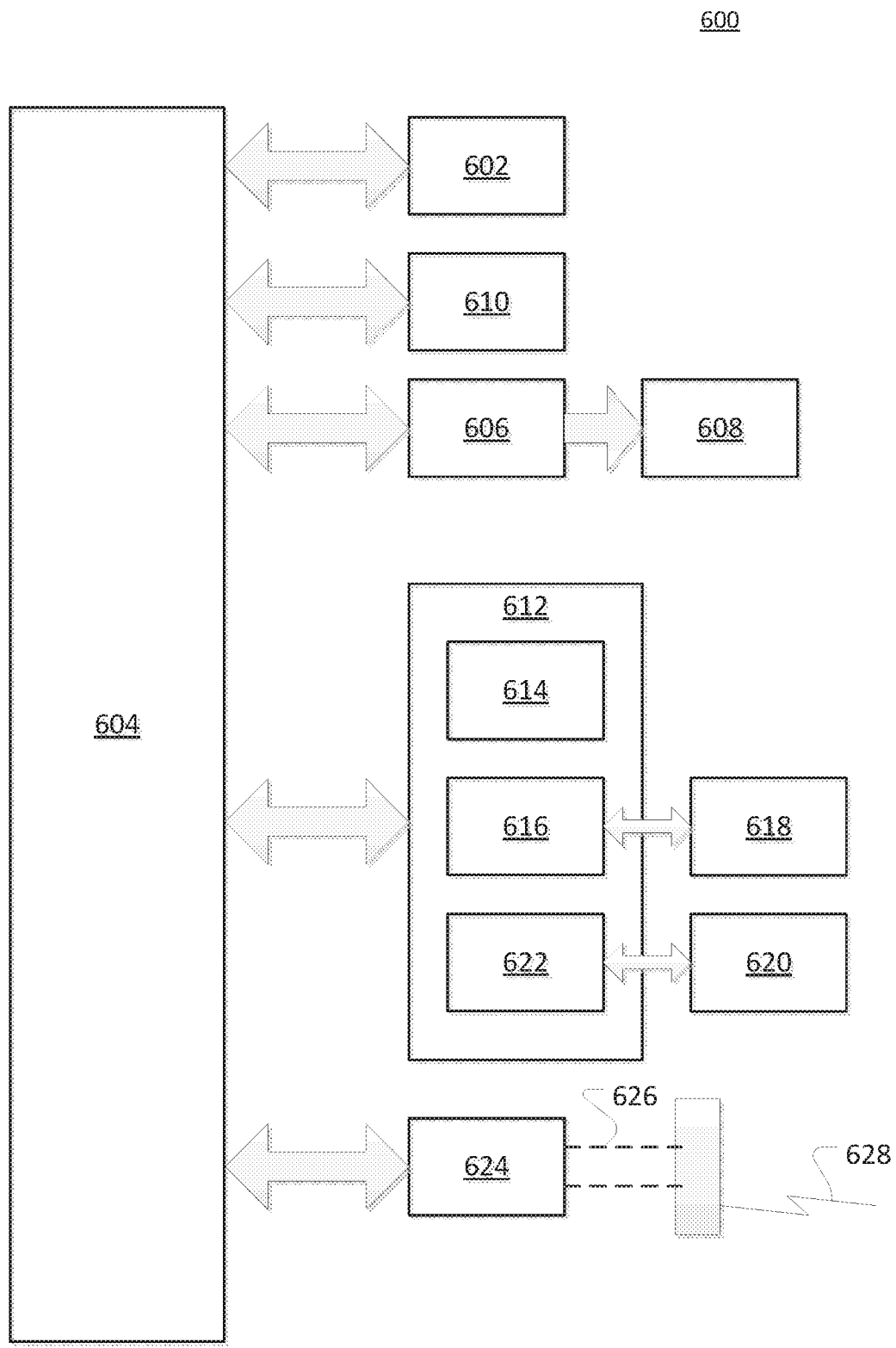
FIG. 3 is a block diagram of an exemplary computer system, according to an aspect of the present disclosure.

A computer-based system 600, as shown in FIG. 3, may comprise all or a portion of the communication portal 200. The computer-based system 600 includes at least one processor, such as a processor 602. The processor 602 may be connected to a communication infrastructure 604, for example, a communications bus, a cross-over bar, a network, or the like. Various software aspects are described in terms of this example computer-based system 600. Upon perusal of the present description, it will become apparent to a person skilled in the relevant art(s) how to implement the present disclosure using other computer systems or architectures.

The computer-based system 600 includes a display interface 606 that forwards graphics, text, or other data from the communication infrastructure 604 or from a frame buffer (not shown) for display on a display unit 608.

The computer-based system 600 further includes a main memory 610, such as random access memory (RAM), and may also include a secondary memory 612. The secondary memory 612 may further include, for example, a hard disk drive 614 or a removable storage drive 616, representing a floppy disk drive, a magnetic tape drive, an optical disk drive, etc. The removable storage drive 616 reads from or writes to a removable storage unit 618 in a well-known manner. The removable storage unit 618 may represent a floppy disk, magnetic tape, or an optical disk, and may be read by and written to by the removable storage drive 616. As will be appreciated, the removable storage unit 618 includes a computer usable storage medium having computer software or data stored therein.

In accordance with various aspects of the present disclosure, the secondary memory 612 may include other similar devices for allowing computer programs or other instructions to be loaded into the computer-based system 600. Such devices may include, for example, a removable storage unit 620, and an interface 622. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit 620 to the computer-based system 600.

The computer-based system 600 may further include a communication interface 624. The communication interface 624 may allow software or data to be transferred between the computer-based system 600 and external devices. Examples of the communication interface 624 include, but may not be limited to a modem, a network interface (such as an Ethernet card), a communications port, a Personal Computer Memory Card International Association (PCMCIA) slot and card, or the like. Software or data transferred via the communication interface 624 may be in the form of a number of signals, hereinafter referred to as signals 626, which may be electronic, electromagnetic, optical or other signals capable of being received by the communication interface 624. The signals 626 may be provided to the communication interface 624 via a communication path (e.g., channel) 628. The communication path 628 carries the signals 626 and may be implemented using wire or cable, fiber optics, a telephone line, a cellular link, a radio frequency (RF) link, or other communication channels.

In this document, the terms "computer program medium" and "computer usable medium" are used to generally refer to media such as the removable storage drive 616, a hard disk installed in the hard disk drive 614, or the like. These computer program products provide software to the computer-based system 600. The present disclosure is directed to such computer program products.

Computer programs (also referred to as computer control logic) may be stored in the main memory 610 or the secondary memory 612. The computer programs may also be received via the communication interface 604. Such computer programs, when executed, enable the computer-based system 600 to perform the functions consistent with the present disclosure, as discussed herein. In particular, the computer programs, when executed, enable the processor 602 to perform the features of the present disclosure. Accordingly, such computer programs represent controllers of the computer-based system 600.

In accordance with an aspect of the present disclosure, where the disclosure is implemented using a software, the software may be stored in a computer program product and loaded into the computer-based system 600 using the removable storage drive 616, the hard disk drive 614, or the communication interface 624. The control logic (software), when executed by the processor 602, causes the processor 602 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software.

Various aspects disclosed herein are to be taken in the illustrative and explanatory sense and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general-purpose computer, special-purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Furthermore, illustrations of the process flow and the descriptions thereof may make reference to user windows, web pages, websites, web forms, prompts, etc. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network-based portal.

While aspects of the present disclosure have been particularly shown and described with reference to the aspects above, it will be understood by those skilled in the art that various additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

The invention claimed is:

1. A non-transitory computer-readable medium storing instructions that when executed by a processor effectuate:
   a communication portal accessible to at least a first user and a second user;
   a text module of the communication portal configured to receive text information, wherein the text module includes at least one text interface configured to receive text information from short message service (SMS) messages and text information from at least one internet-based text messaging application;
   a video module of the communication portal configured to receive video information, wherein the video module includes at least one video interface configured to receive previously recorded video information and video information from at least one internet-based video chat application;
   an audio module of the communication portal configured to receive audio information, wherein the audio module includes at least one audio interface configured to receive audio information from a telephone network and audio information from a voicemail messaging system;
   a screen sharing module configured to provide an output of a display of the first user to the second user; and
   a document management module integrated with the screen sharing module configured to permit the first user and the second user to simultaneously edit a document on the display of the first user, wherein the output of the display of the first user to the second user dynamically changes based on changes to the document made by the first user and the second user.

2. The non-transitory computer-readable medium of claim 1, comprising:
   an electronic signature module configured to provide a document for review to at least one of the first user and the second user and affix one or more electronic signatures of the at least one of the first user and the second user to the document.

3. The non-transitory computer-readable medium of claim 2, wherein the electronic signature module is configured to:
   receive a biometric input of the at least one of the first user and the second user; and
   prior to affixing the one or more electronic signatures of the at least one of the first user and the second user to the document, verifying the biometric input of the at least one of the first user and the second user.

4. The non-transitory computer-readable medium of claim 3, wherein the biometric input is a voice of the at least one of the first user and the second user, and wherein the audio module is configured to receive the voice of the at least one of the first user and the second user.

5. The non-transitory computer-readable medium of claim 1,
   wherein the document management module configured to receive a document from the first user and provide the document to the second user.

6. The non-transitory computer-readable medium of claim 1, wherein the video module is configured to simultaneously provide video information from two or more sources.

7. The non-transitory computer-readable medium of claim 1, wherein the text module is configured to provide a predefined message for the second user to send to the first user based on a profile of the first user.

8. The non-transitory computer-readable medium of claim 1, wherein the text module is configured to provide a predefined message for the second user to send to the first user based on a profile of the second user.

9. A method, comprising:
receiving text information via a text module, wherein the text module includes at least one text interface configured to receive text information from short message service (SMS) messages and text information from at least one internet-based text messaging application;
receiving video information via a video module, wherein the video module includes at least one video interface configured to receive previously recorded video information and video information from at least one internet-based video chat application; and
receiving audio information via an audio module, wherein the audio module includes at least one audio interface configured to receive audio information from a telephone network and audio information from a voicemail messaging system;
providing a communication portal accessible to at least a first user and a second user, wherein the communication portal is configured to provide the text information, the video information, and the audio information to the first user and the second user;
providing an output of a display of the first user to the second user; and
providing an interface for the first user and the second user to simultaneously edit a document on the display of the first user, wherein the output of the display of the first user to the second user dynamically changes based on changes to the document made by the first user and the second user.

10. The method of claim 9, comprising:
providing a document for review to at least one of the first user and the second user; and
affixing one or more electronic signatures of the at least one of the first user and the second user to the document.

11. The method of claim 9, comprising:
simultaneously providing video information from two or more sources.

12. The method of claim 9, comprising providing a predefined message for the second user to send to the first user based on a profile of the first user.

13. The method of claim 9, comprising providing a predefined message for the second user to send to the first user based on a profile of the second user.

14. A system comprising:
means for receiving text information including at least one text interface configured to receive text information from short message service (SMS) messages and text information from at least one internet-based text messaging application;
receiving video information via a video module including at least one video interface configured to receive previously recorded video information and video information from at least one internet-based video chat application; and
means for receiving audio information including at least one audio interface configured to receive audio information from a telephone network and audio information from a voicemail messaging system;
means for providing an interface accessible to at least a first user and a second user, wherein the interface is configured to provide the text information, the video information, and the audio information to the first user and the second user;
means for providing an output of a display of the first user to the second user; and
means for providing an interface for the first user and the second user to simultaneously edit a document on the display of the first user, wherein the output of the display of the first user to the second user dynamically changes based on changes to the document made by the first user and the second user.

15. The system of claim 14, comprising:
means for providing a document for review to at least one of the first user and the second user; and
means for affixing one or more electronic signatures of the at least one of the first user and the second user to the document.

16. The system of claim 14, comprising means for providing a predefined message for the second user to send to the first user based on a profile of the first user.

17. The system of claim 14, comprising means for providing a predefined message for the second user to send to the first user based on a profile of the second user.

* * * * *